United States Patent
Park

(10) Patent No.: US 8,963,542 B2
(45) Date of Patent: Feb. 24, 2015

(54) MINIMIZING MAGNETIC INTERFERENCE IN A VARIABLE RELUCTANCE RESOLVER EXCITED BY 180 DEGREE DIFFERENTIAL SIGNALS

(76) Inventor: Chun Soo Park, Seoul (KR)

( * ) Notice: Subject to any disclaimer, the term of this patent is extended or adjusted under 35 U.S.C. 154(b) by 301 days.

(21) Appl. No.: 13/442,613

(22) Filed: Apr. 9, 2012

(65) Prior Publication Data

US 2012/0194177 A1    Aug. 2, 2012

Related U.S. Application Data

(63) Continuation-in-part of application No. 12/484,207, filed on Jun. 13, 2009, now Pat. No. 8,278,915.

(51) Int. Cl.
*G01D 3/032*    (2006.01)

(52) U.S. Cl.
CPC ...................................... *G01D 3/032* (2013.01)

USPC ...................................................... 324/207.24

(58) Field of Classification Search
None
See application file for complete search history.

(56) References Cited

U.S. PATENT DOCUMENTS 4,951,549 A * 8/1990 Olsen et al. ................ 91/363 R
8,278,915 B2 * 10/2012 Park ......................... 324/207.25

* cited by examiner

*Primary Examiner* — Paresh Patel

(57) ABSTRACT

A multi-pole variable reluctance resolver is balanced wired and driven by 180 degree differential signals. Capacitive passive elements may be serially added to the resolver to minimize magnetic interference and cancel flux between poles of the same polarity and orthogonal poles, as well as minimize the effect of input driving signal distortion. Symmetric networks of resistive and capacitive elements may also be added to the resolver to overcome noise sensitivity associated with balanced wired resolvers.

3 Claims, 19 Drawing Sheets

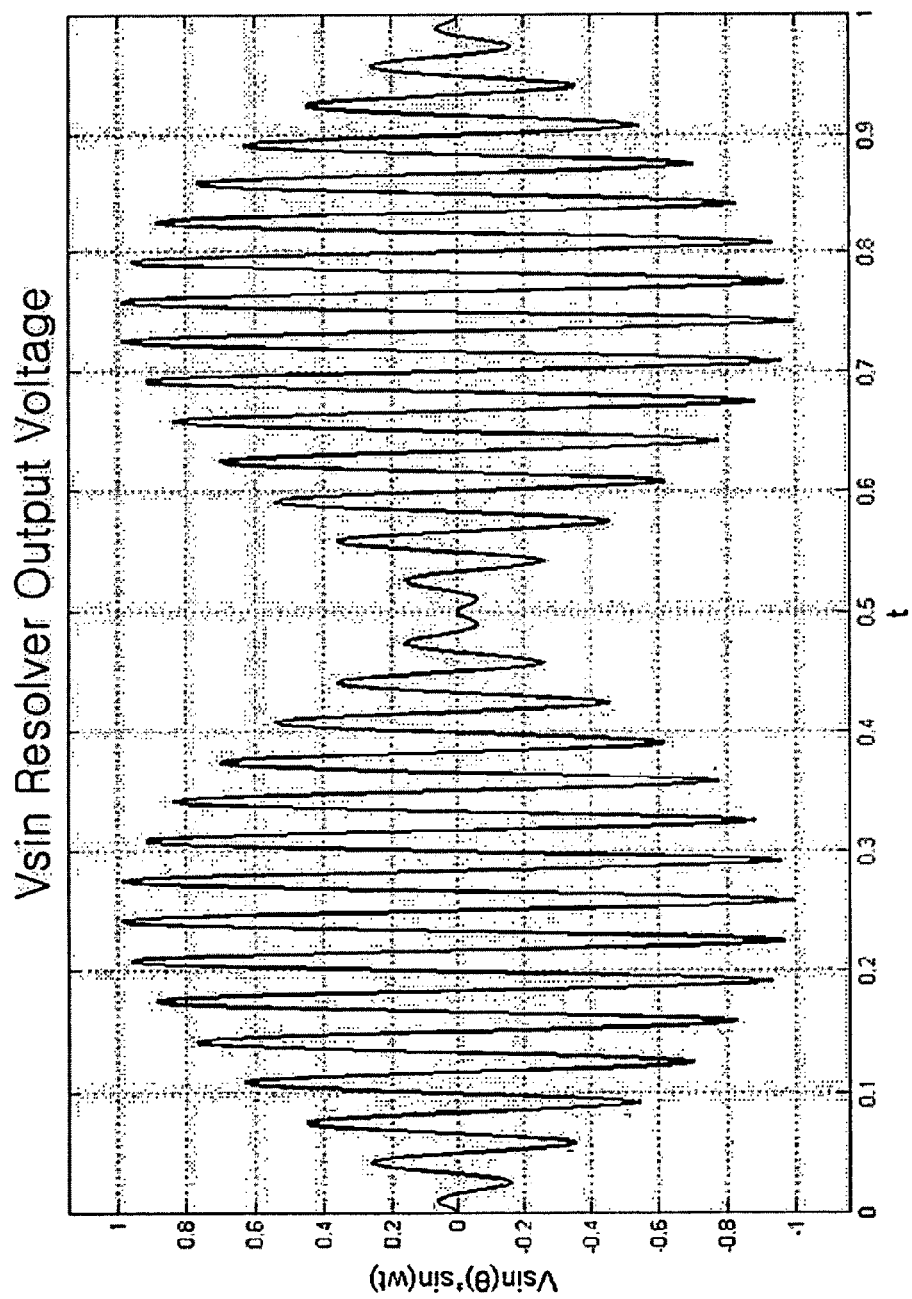
FIG. 3-a

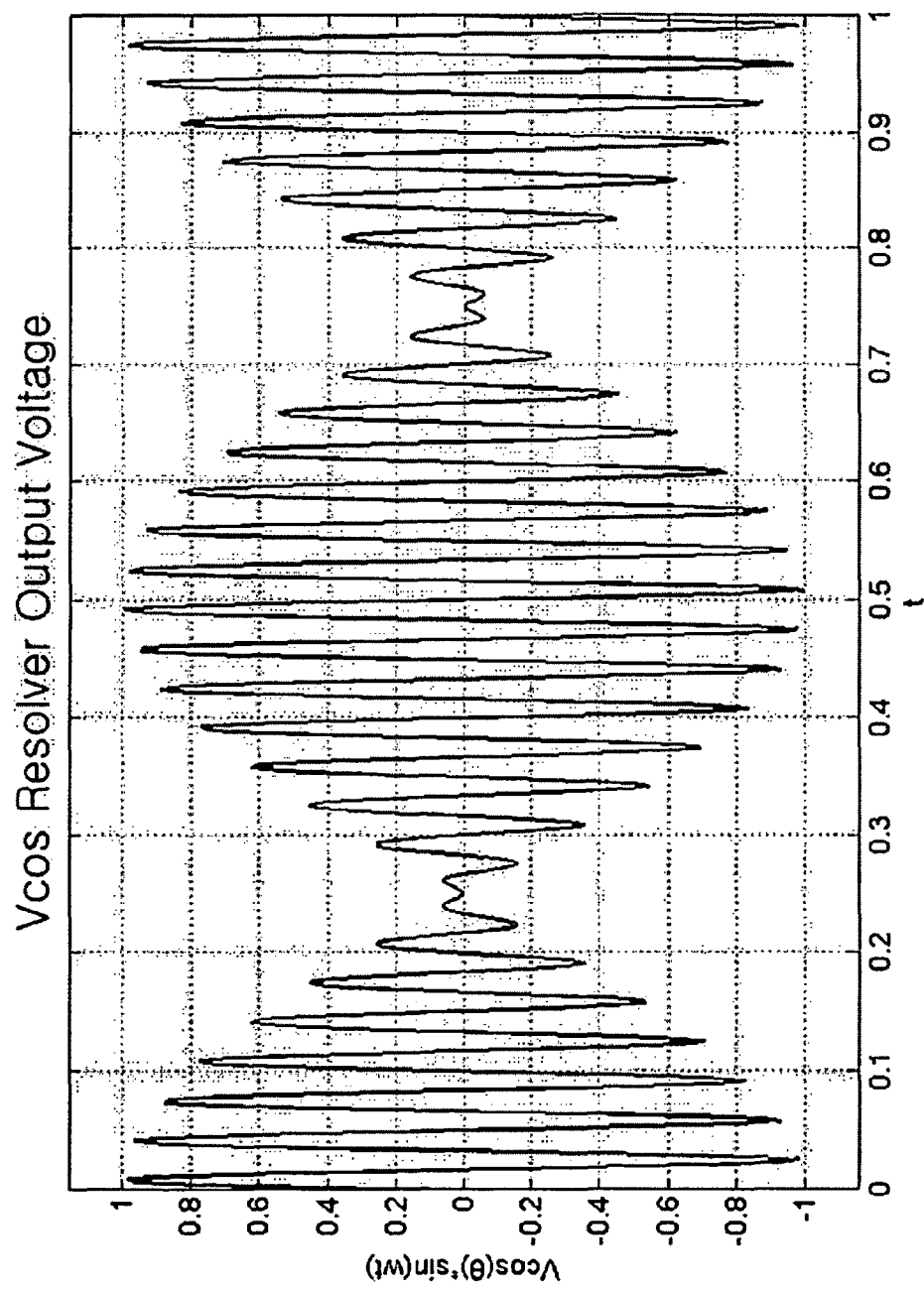
FIG. 3-b

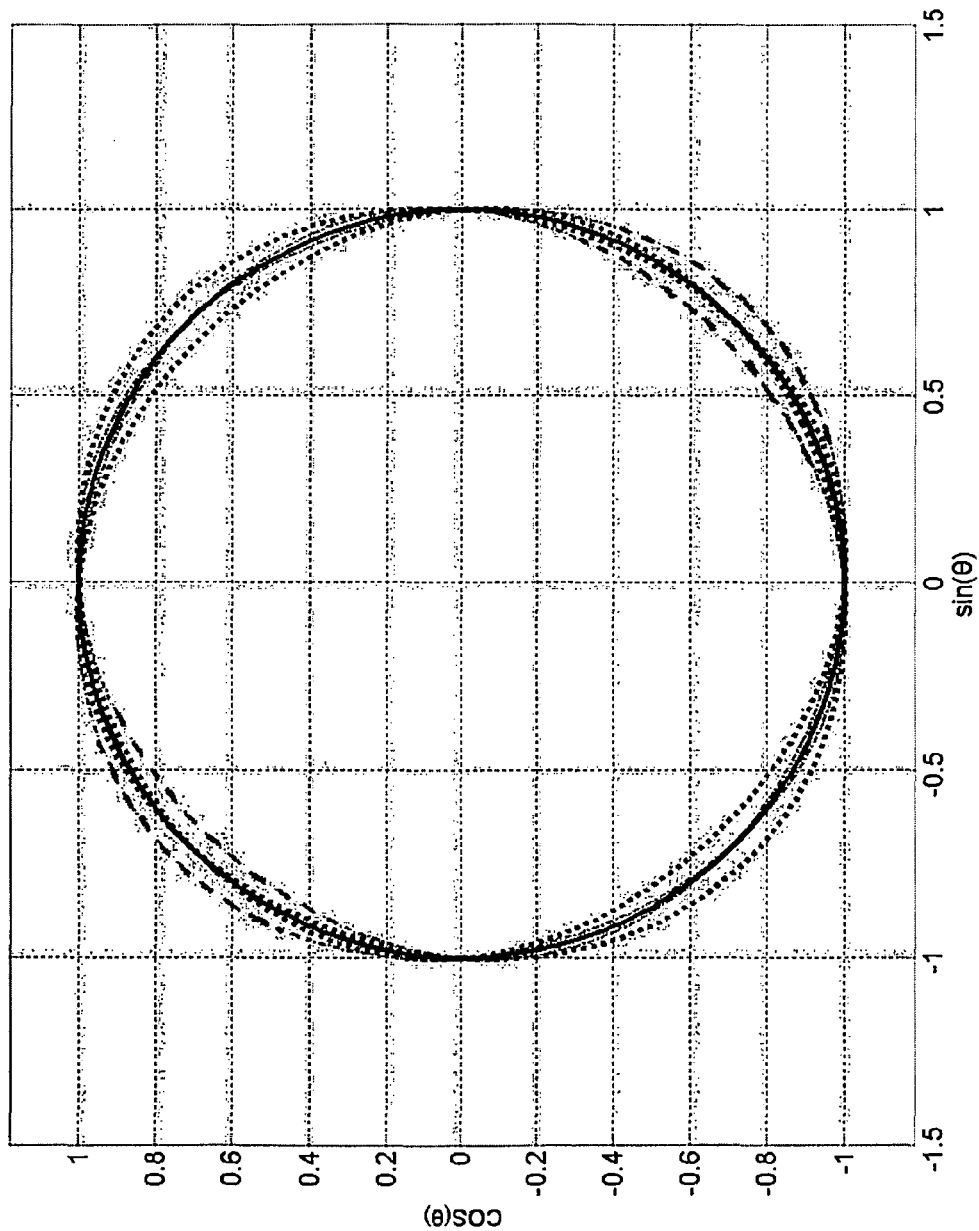
FIG. 6-a

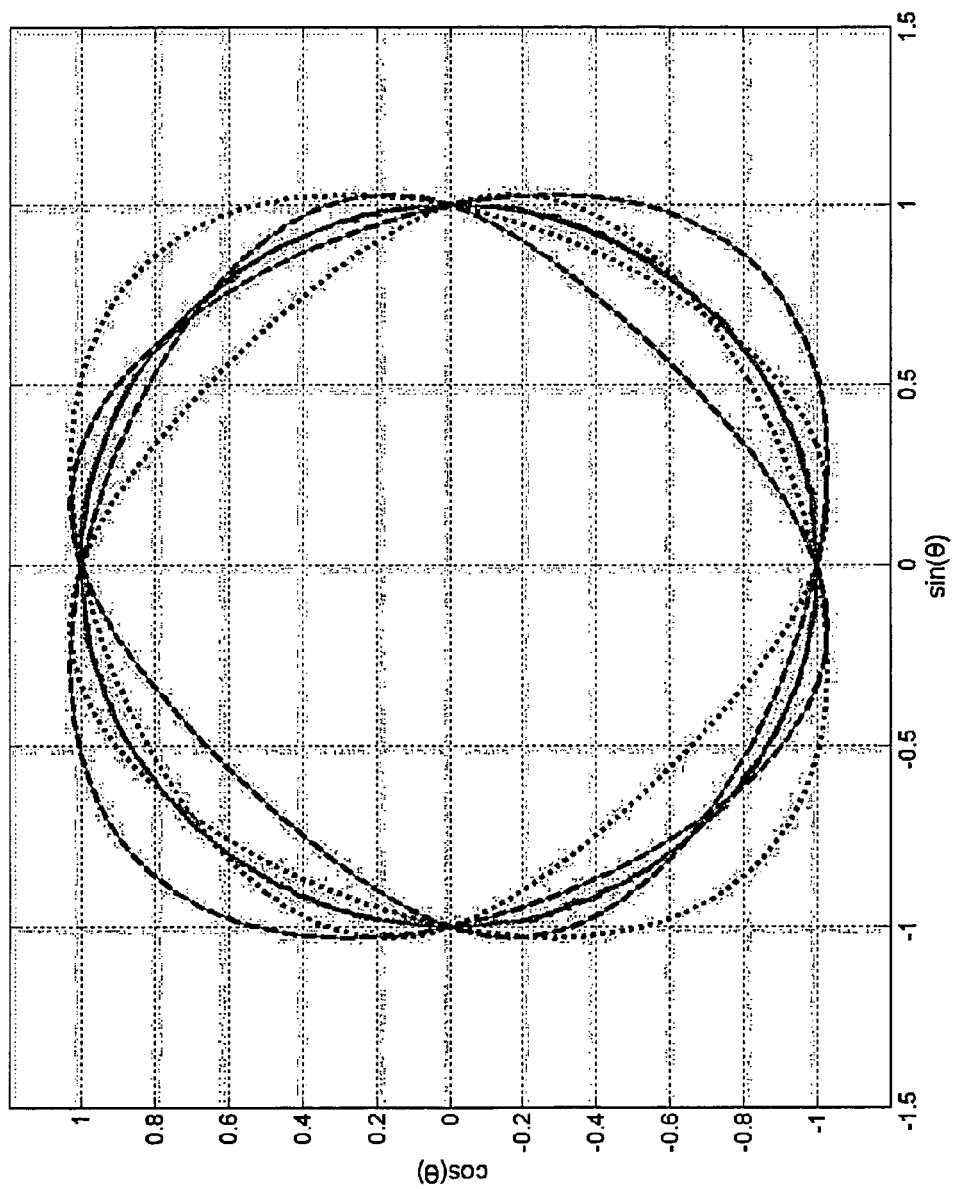
FIG. 6-b

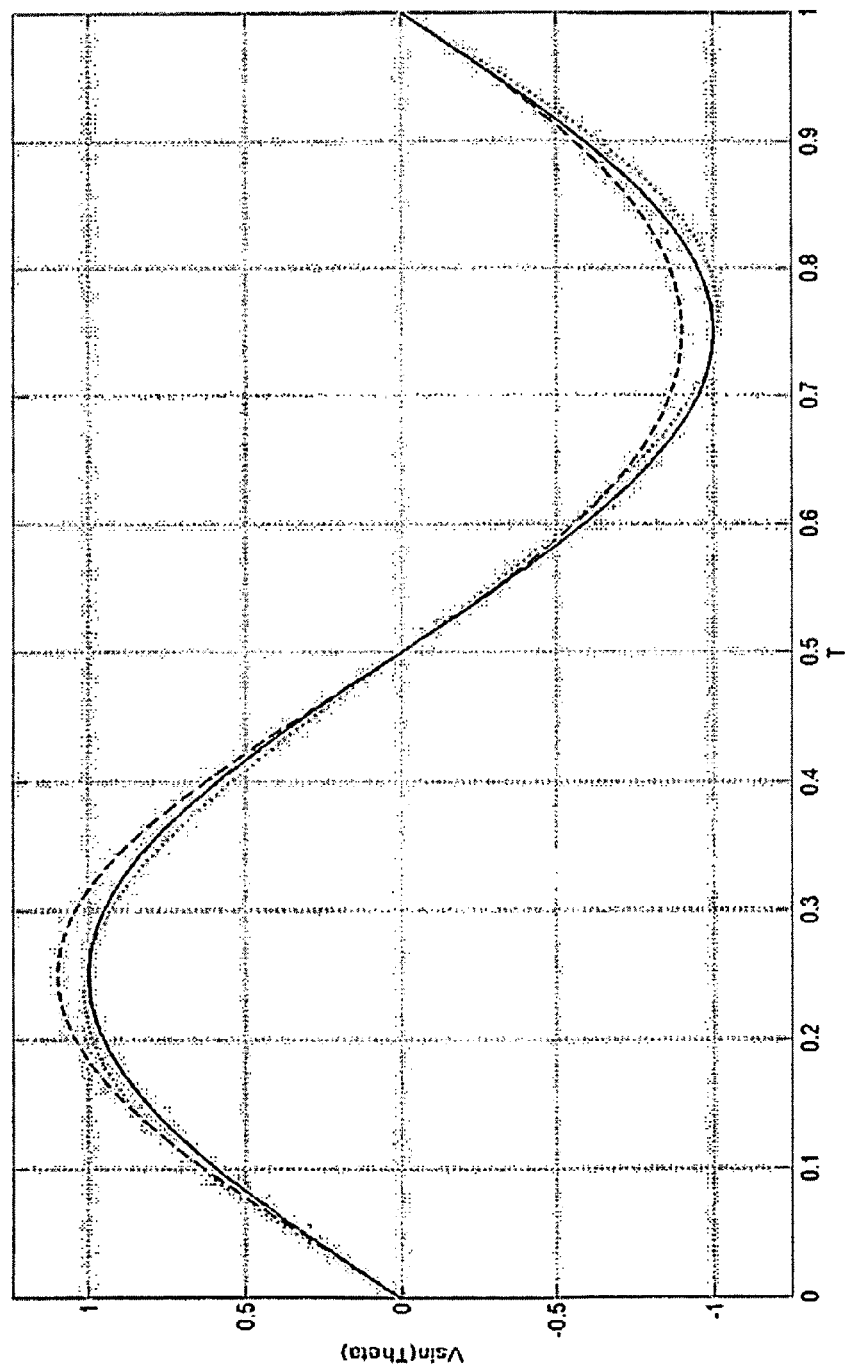
FIG. 11-a

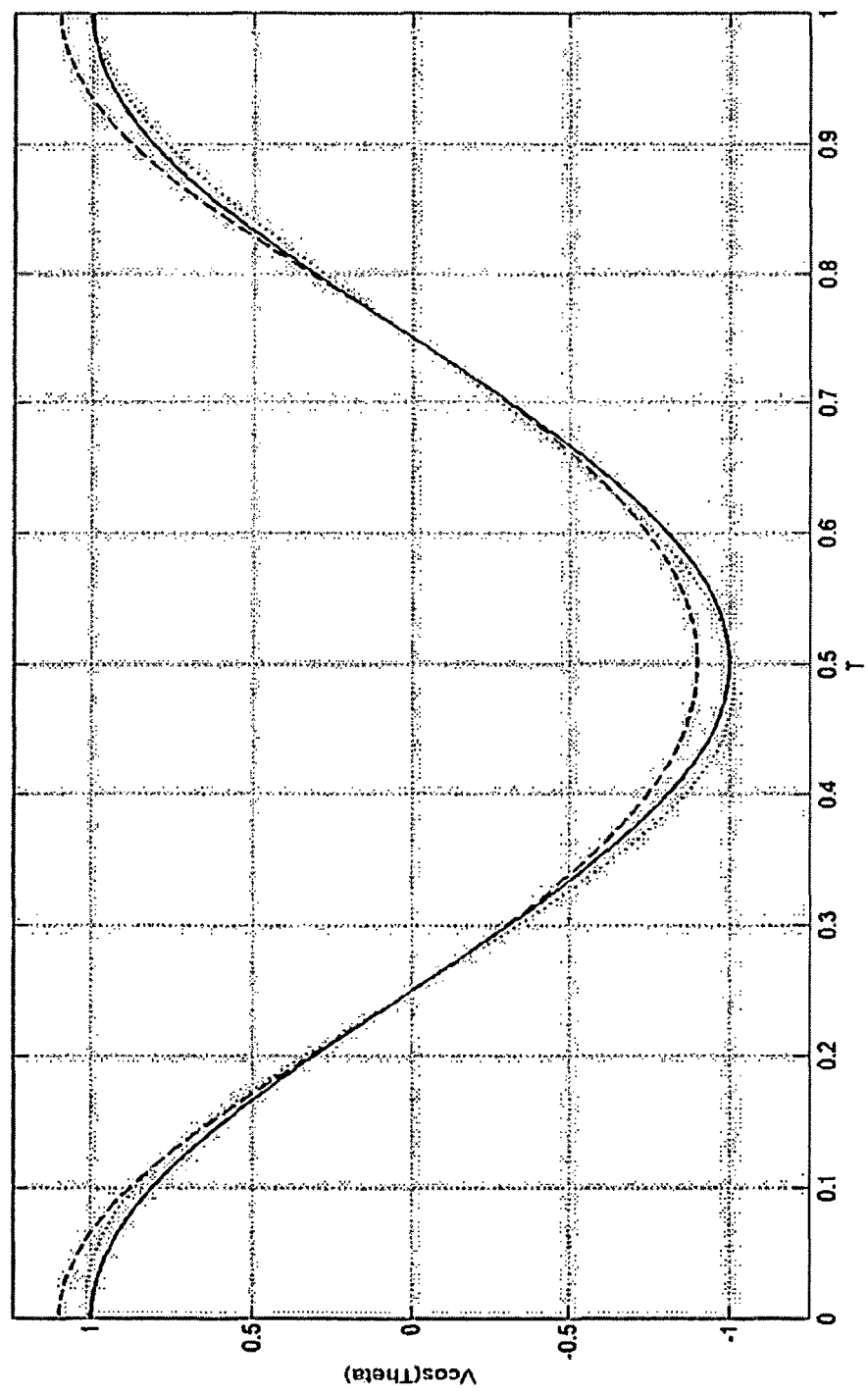
FIG. 11-b

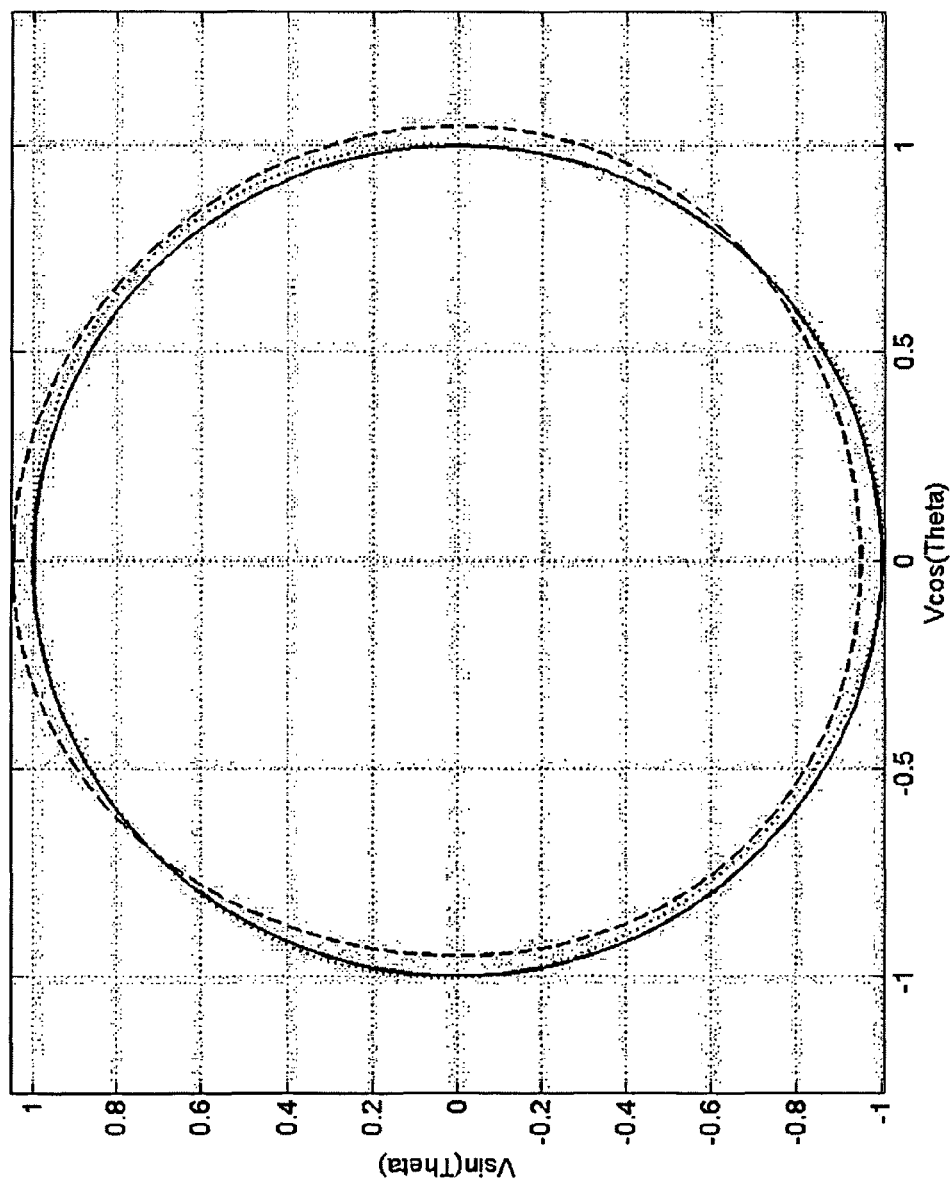
FIG. 11-c

MINIMIZING MAGNETIC INTERFERENCE IN A VARIABLE RELUCTANCE RESOLVER EXCITED BY 180 DEGREE DIFFERENTIAL SIGNALS

CROSS-REFERENCE TO RELATED APPLICATIONS

Pursuant to 35 U.S.C. 119(a) and 119(d), this application claims priority to Korean Patent Application No. 10-2011-0059121 filed on Jun. 17, 2011. The content of said application is incorporated by reference herein in its entirety.

Pursuant to 35 U.S.C. 120, this application is a continuation-in-part of U.S. patent application Ser. No. 12/484,207 filed on Jun. 13, 2009. The content of said application is incorporated by reference herein in its entirety.

TECHNICAL FIELD

The claimed subject matter relates generally to electromechanical systems and, more particularly, to a resolver apparatus and methods for measuring angular position of a resolver shaft.

BACKGROUND

A resolver is a rotary transformer comprising a rotor and a stator with one or more windings (i.e., coils). In response to excitation by one or more source signals, the windings output one or more sine (sin) or cosine (cos) signals (i.e., output voltages). The magnitude and phase of the sin and cos signals are used to determine the angular position of a resolver shaft.

Typically, a multi-pole resolver is used for high resolution applications. A multi-pole resolver houses multiple sin/cos pole windings in the stator and thus provides more accuracy than a basic resolver. Unfortunately, multi-pole resolvers have a more complex physical structure than basic revolvers. Since $\sin(\theta)$, $\sin(\theta+180)$, $\cos(\theta)$, and $\cos(\theta+180)$ pole windings share a common resolver core, magnetic flux interference among the poles increases as resolver rotation speed increases. The magnetic flux interference distorts the sin and cos output signals and breaks their orthogonality, which results in decreased accuracy of angular position measurements.

SUMMARY

The present disclosure is directed to minimizing magnetic flux interference in a variable reluctance resolver, including minimizing interference between poles of the same polarity and interference generated by higher order harmonics between orthogonal poles.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

As disclosed in U.S. patent application Ser. No. 12/484,207, a resolver apparatus may comprise capacitive passive elements that are serially connected to coil windings. The capacitive passive elements have a frequency dependent reactance property, in which there is high reactance (i.e., impedance) on the current of the resolver rotation frequency and low reactance (i.e., impedance) on the current of the driving signal frequency.

The capacitive passive elements cause a 90 degree phase shift of the rotation current. Magnetic flux interference is canceled mutually and interactively by the induced flux generated by the phase shifted rotation current on each of the coil windings. Additionally, second-order harmonics between orthogonal poles (i.e., the $\sin(\theta)$ and $\cos(\theta)$ poles) are minimized by the phase shifted rotation current, allowing more accurate angular position measurement when the resolver rotation frequency is less than a few hundred hertz (Hz).

The present disclosure provides a method and apparatus of achieving high accuracy of angular displacement measurement in a multi-pole resolver under the electrical and mechanical impairments normally faced in practical realization. The present invention is an improvement over the invention disclosed in U.S. patent application Ser. No. 12/484,207.

In accordance with one embodiment, a resolver signal processing method comprises driving two 180 degree differential sinusoidal signals through a balanced wired resolver, minimizing magnetic flux interference between poles of the same polarity in the balanced wired resolver; adding a capacitive passive network to the resolver to maintain a constant phase with respect to a rotating resolver current, minimizing magnetic flux interference between orthogonal poles of the resolver; adding a symmetrical network comprising resistive and capacitive elements to the resolver at the same location where the 180 degree differential driving signals are applied, minimizing magnetic flux interference by complementing the external noise engagement to the resolver; and outputting a distortion minimized revolver output signal.

In accordance with another embodiment, a high resolution resolver apparatus comprises a balanced resolver wiring, wherein capacitive passive elements are serially attached to the resolver wiring; a source generation unit for generating 180 degree phase differential sinusoidal signals (i.e., $\sin(\theta)$ and $\sin(\theta+180)$), wherein the resolver apparatus is driven by the sinusoidal signals; a capacitive and resistive network symmetrically connected to the resolver wiring at the applying point of the sinusoidal signals.

One or more of the embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

FIG. 3(a) illustrates a modulated sine (V sin) waveform outputted by an ideal resolver, in accordance with one or more embodiments.

FIG. 3(b) illustrates a modulated cosine (V cos) waveform outputted by an ideal resolver, in accordance with one or more embodiments.

FIG. 6(a) is a Lissajous graph of resolver output waveforms between orthogonal poles when an exemplary resolver rotates at 60 Hz, in accordance with one or more embodiments.

FIG. 6(b) is a Lissajous graph of resolver output waveforms between orthogonal poles when an exemplary resolver rotates at 200 Hz, in accordance with one or more embodiments.

FIG. 11(a) illustrates a set of comparative waveforms of V sin output voltage with and without capacitive passive elements as compared with an ideal waveform, in accordance with one or more embodiments.

FIG. 11(b) illustrates a set of comparative waveforms of V cos output voltage with and without capacitive passive elements as compared with an ideal waveform, in accordance with one or more embodiments.

FIG. 11(c) illustrates a set of comparative Lissajous graphs of output voltage with and without capacitive passive elements as compared with an ideal waveform, in accordance with one or more embodiments.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
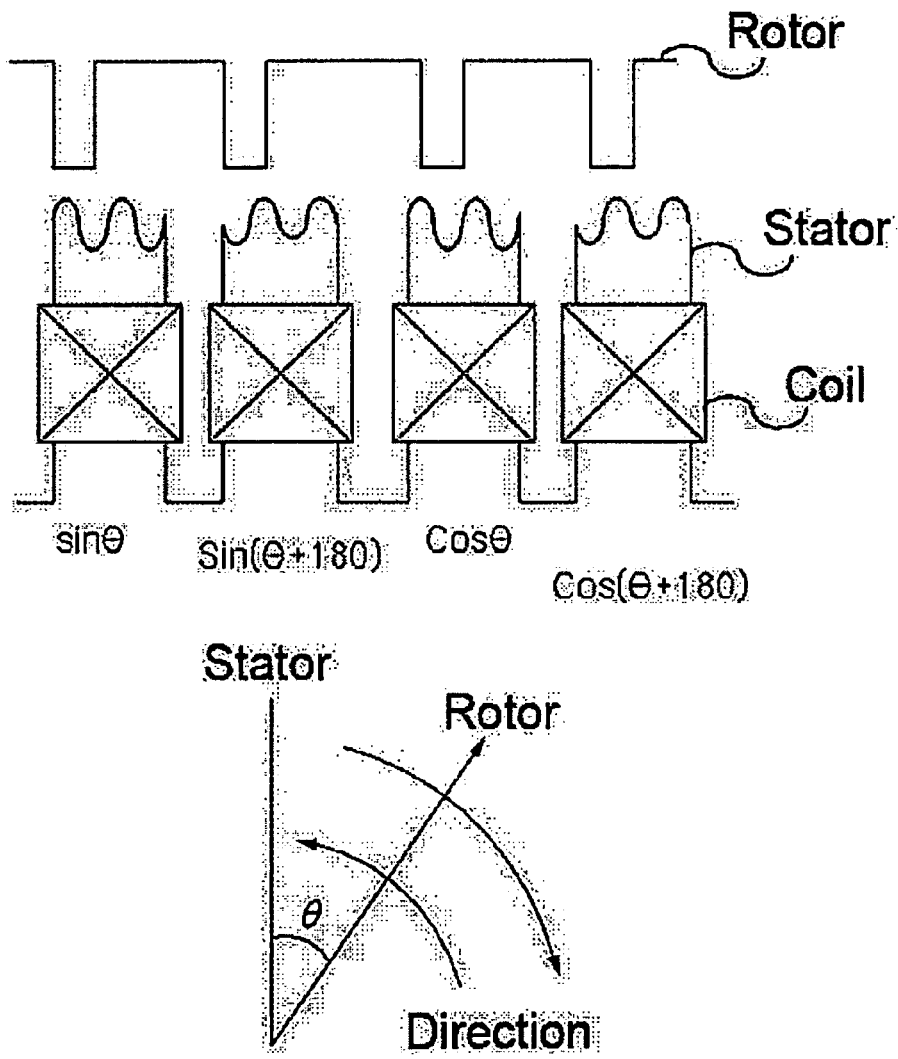
FIG. 1 illustrates an exemplary multi-pole resolver, in accordance with one or more embodiments.

Referring to FIG. 1, an exemplary multi-pole resolver comprises a rotor, a stator, and a coil with two or more stator windings. Each winding of the coil is associated with a pole (e.g., sin(θ), sin(θ+180), cos(θ), or cos(θ+180) poles), where θ refers to a rotation angle of the resolver.

Figure 2:
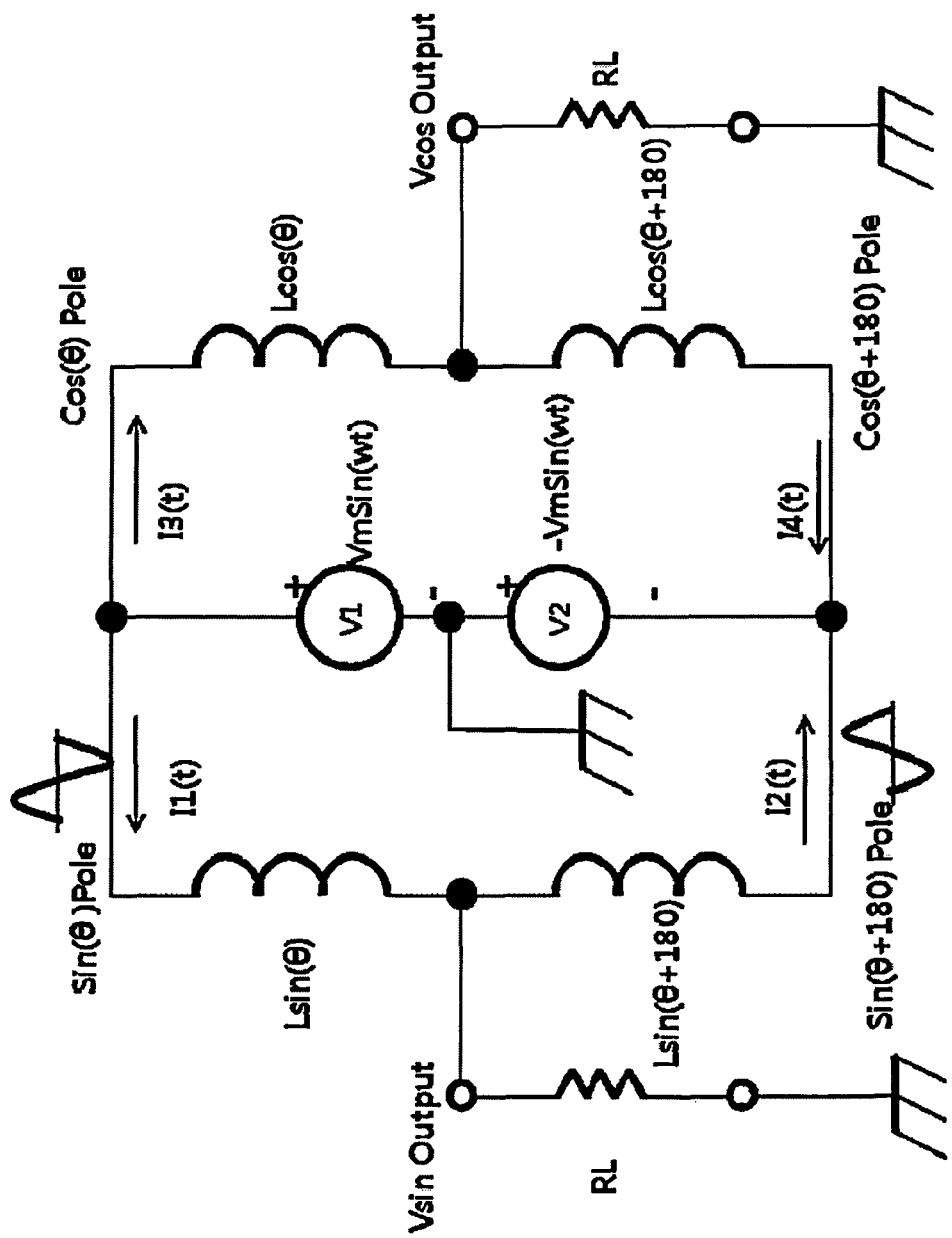
FIG. 2 illustrates an exemplary balanced wired resolver that is differentially driven by $\sin(\theta)$ and $\sin(\theta+180)=-\sin(\theta)$, in accordance with one or more embodiments.

FIG. 2 is a circuit diagram of an exemplary ideal balanced wired resolver. A balanced wired resolver typically refers to a resolver wiring; sin(θ) and sin(θ+180) (and cos(θ) and cos(θ+180)) are serially connected and an output signal is sensed at the center connecting point.

As the balanced wired resolver rotates with rotation angle θ, the variable reluctance at the sin(θ), sin(θ+180), cos(θ), and cos(θ+180) poles are expressed as follows, respectively:

$$L\sin(\theta) = Ls(1 + m \cdot \sin(\theta))[H] \quad (1)$$

$$L\sin(\theta+180) = Ls(1 + m \cdot \sin(\theta+180)) = Ls(1 - m \cdot \sin(\theta))[H] \quad (2)$$

$$L\cos(\theta) = Ls(1 + m \cdot \cos(\theta))[H] \quad (3)$$

$$L\cos(\theta+180) = Ls(1 + m \cdot \cos(\theta+180)) = Ls(1 - m \cdot \cos(\theta))[H] \quad (4)$$

Ls denotes intrinsic inductance in H (henry) and m may depend on the mechanical structure of the resolver core. Ls and m are constants that depend on the resolver coil winding and the mechanical geometry of the stator-rotor configuration.

As shown in FIG. 2, the balanced wired resolver is driven by signals with a 180 degree differential. The sin(θ) and cos(θ) poles are driven by [V·sin(wt)], while the sin(θ+180) and cos(θ+180) poles are driven by [−V·sin(wt)]=[−V·sin(wt+180)]. Let I1(t), I2(t) I3(t), and I4(t) be the currents flowing through poles sin(θ), cos(θ), sin(θ+180), and cos(θ+180), respectively. Then, the electromagnetic induced voltages at poles sin(θ), sin(θ+180), cos(θ), and cos(θ+180) are as follows, respectively:

$$V\sin(\theta) = w^* Ls(1 + m \cdot \sin(\theta))^* I1(t) \quad (5)$$

$$V\sin(\theta+180) = w^* Ls(1 - m \cdot \sin(\theta))^* I2(t) \quad (6)$$

$$V\cos(\theta) = w^* Ls(1 + m \cdot \cos(\theta))^* I3(t) \quad (7)$$

$$V\cos(\theta+180) = w^* Ls(1 - m \cdot \cos(\theta))^* I4(t) \quad (8)$$

When the resolver circuit is balanced without distortion, all the currents through the poles are same, I1(t)=I2(t)=I3(t)=I4(t)=I*sin(wt). In such a case, the resolver output voltage at the sine and cosine poles can be defined as follows, respectively:

$$V\sin = V\sin(\theta) - V\sin(\theta+180) = K^* \sin(\theta)^* \sin(wt) \quad (9)$$

$$V\cos = V\cos(\theta) - V\cos(\theta+180) = K^* \cos(\theta)^* \sin(wt) \quad (10)$$

V sin and V cos refer to the resolver output voltage of sine and cosine poles, respectively; w refers to angular speed of the driving voltage; and t refers to time. K is a constant that depends on the intrinsic characteristics of the resolver, Ls, and m.

The above-noted equations (1) through (10) show that the ideal resolver output voltage waveform may be obtained for a resolver if the resolver is implemented as a balanced wired resolver shown in FIG. 2.

Referring to FIGS. 3(a) and (b), the resolver output voltage waveform of equation (9) and (10) is shown when K=1, w=188 radians (rads) per second (sec), and θ=6.28 rads, respectively.

Figure 4:
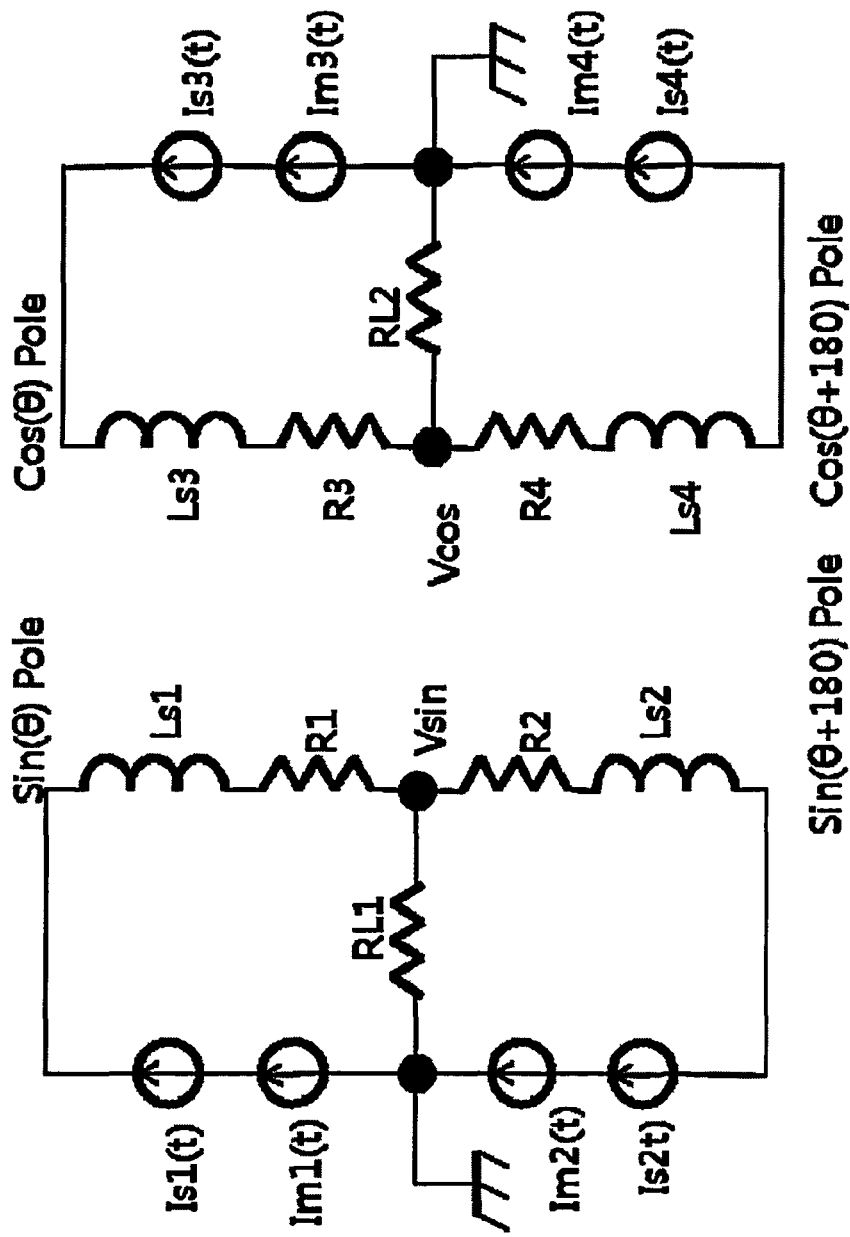
FIG. 4 is an equivalent circuit diagram of an exemplary balanced wired resolver, in accordance with one or more embodiments.

An equivalent circuit for FIG. 2 is shown in FIG. 4 to explain the characteristics of the balanced wired resolver, where Is1(t), Is2(t), Is3(t), and Is4(t) refer to dependent currents induced by their own resolver driving voltage, while Im1(t), Im2(t), Im3(t), and Im4(t) refer to mutual interference currents induced by voltages from other poles. R1, R2, R3, and R4 refer to the resistance in the resolver wiring. RL1 and RL2 refer to load resistance for detecting the output voltage V sin and V cos, respectively.

Referring to FIG. 4, the dependent currents and interference currents can be expressed as follows:

$$Is1(t)=I0(1+m*\sin(\theta)) \quad (11)$$

$$Is2(t)=I0(1-m*\sin(\theta)) \quad (12)$$

$$Is3(t)=I0(1+m*\cos(\theta)) \quad (13)$$

$$Is4(t)=I0(1-m*\cos(\theta)) \quad (14)$$

$$Im1(t)=\Sigma(\text{Interference current induced from }\sin(\theta)\text{ pole}) \quad (15)$$

$$Im2(t)=\Sigma(\text{Interference current induced from }\sin(\theta+180)\text{ pole}) \quad (16)$$

$$Im3(t)=\Sigma(\text{Interference current induced from }\cos(\theta)\text{ pole}) \quad (17)$$

$$Im4(t)=\Sigma(\text{Interference current induced from }\cos(\theta+180)\text{ pole}) \quad (18)$$

$$V\sin=RL1*[(Is1-Is2)+(Im1-Im2)] \quad (19)$$

$$V\cos=RL2*(Is3-Is4)+(Im3-Im4)] \quad (20)$$

In general, multi-pole variable reluctance type resolvers such as the exemplary resolver shown in FIG. 1 comprise two sine poles, sin(θ) and sin(θ+180), and two cosine poles, cos(θ) and cos(θ+180), which share a magnetic circuit in common. Hence, distortion of resolver output voltage due to magnetic flux interference is unavoidable and varies depending on the shape and direction of the resolver wiring.

Magnetic flux interference in a resolver can be attributed to two factors: self interference within poles of the same polarity and the cross interference between orthogonal poles.

The self interference between the sin(θ) and sin(θ+180) poles is a function of $K^2*\sin(\theta)*\sin(\theta+180)$. The self interference between the cos(θ) and cos(θ+180) poles is a function of $K^2*\cos(\theta)*\cos(\theta+180)$.

The cross interference between orthogonal the sin(θ) and cos(θ) poles is a function of $K^2*\sin(\theta)*\cos(\theta)$. The cross interference between the orthogonal sin(θ+180) and cos(θ+180) poles is a function of $K^2*\sin(\theta+180)*\cos(\theta+180)$.

The cross interference between the sin(θ) and cos(θ+180) poles is a function of $K^2*\sin(\theta)*\cos(\theta+180)$. The cross interference between the sin(θ+180) and cos(θ) poles is a function of $K^2*\sin(\theta+180)*\cos(\theta)$.

For any arbitrary resolver rotation angle θ and driving voltage angular speed w, the phase of the interference current induced from sin(θ), sin(θ+180), cos(θ), and cos(θ+180) poles is (1+m*sin(θ))*[V*sin(wt)] (positive direction), (1−m*sin(θ))*[−V*sin(wt)] (positive direction), (1+m*cos(θ))*[V*sin(wt)] (positive direction), and (1−m*cos(θ))*[−V*sin(wt)] (positive direction), respectively.

It should be noted that the phases of all four interferences are equal and have the same direction regardless of the values of θ, w, and t. Moreover, the magnitude of the interference currents are balanced for a balanced wired resolver since the resolver wiring reacts in a balanced fashion between the poles of the same polarity and between orthogonal poles. Therefore, the interference currents in equation (19) and (20) cancel each other out since Im1=Im2 and Im3=Im4.

However, the perfect interference cancelation described above holds true only when the resolver driving signal is a non-distorted ideal sinusoidal signal, which is rarely, if ever, achieved in practice. When the resolver driving signal is a distorted sinusoidal signal such as a square wave signal, the resolver driving voltages, for example, V1 and V2 from FIG. 2, are better expressed by a Fourier series expansion as follows:

$$V1=A1*\sin(wt)+A2*\sin(2wt)+A3*\sin(3wt)+\ldots \quad (21)$$

$$V2=A1*\sin(wt+180)+A2*\sin(2wt+180)+A3*\sin(3wt+180)+\ldots \quad (22)$$

A1, A2, and A3 are Fourier coefficients of the fundamental, $2^{nd}$, and $3^{rd}$ order harmonics, respectively.

Higher order ($2^{nd}$ order, $3^{rd}$ order, etc.) harmonics contribute to magnitude distortion of the resolver driving voltages. The $2^{nd}$ and $3^{rd}$ order harmonics are decomposed according to the equations:

$$\sin(2wt)=[2*\cos(wt)]*\sin(wt) \quad (23)$$

$$\sin(3wt)=[3*\cos^2(wt)-\sin^2(wt)]*\sin(wt) \quad (24)$$

However, if the phase difference between V1 and V2 is always 180 degrees, then the phases of V1 and V2 are positive and negative, respectively, or vice versa. This implies that, even with the distorted resolver driving signal, interference current can be canceled mutually and interactively as shown in equations (19) and (20) using a balanced wired resolver as long as the phase difference between V1 and V2 is 180 degrees.

So far, it has been assumed that the resolver is in a static state. However, as the resolver rotates, interference flux inside the resolver arises due to current phase variations in proportion to resolver rotation speed. It is practically impossible to completely get rid of this dynamic interference flux associated with current phase variations, but the dynamic interference flux may be minimized using balanced wiring and differential driving.

Figure 5:
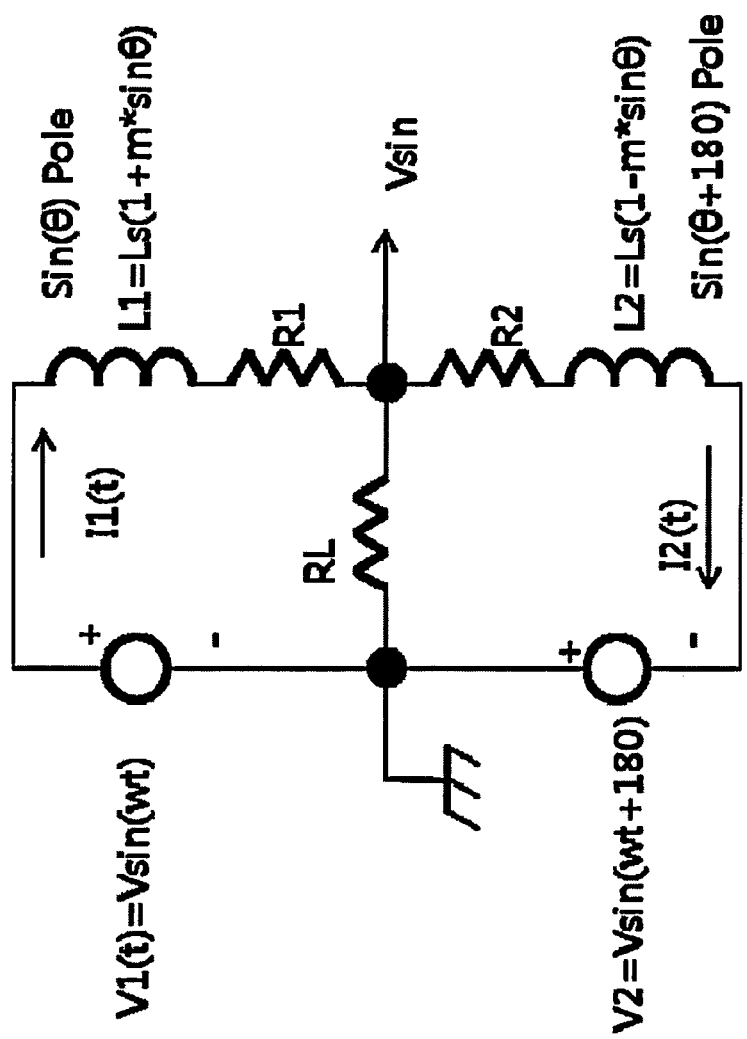
FIG. 5 is an equivalent circuit diagram of voltages and currents at the sine poles, in accordance with one or more embodiments.

FIG. 5 is an equivalent circuit diagram of the voltages and currents at the sin poles that shows the current in response to the voltage applied to the resolver.

If R1+RL=R2+RL=R, then the current flowing through the sine poles I1(t) and I2(t) may be expressed as follows:

$$I1(t) = \frac{V}{\sqrt{(R^2 + (wL1)^2)}} \sin(wt - \phi1) \quad (25)$$

$$\phi1 = \tan^{-1}\left[\frac{wL1}{R}\right] \quad (26)$$

$$I2(t) = \frac{V}{\sqrt{(R^2 + (wL2)^2)}} \sin(wt - \phi2) \quad (27)$$

$$\phi2 = \tan^{-1}\left[\frac{wL2}{R}\right] \quad (28)$$

Inductance L1 and inductance L2 at the resolver rotation phase θ may be defined as Ls(1+m*sin(θ)) and Ls(1−m*sin(θ)), respectively. When the resolver is in static state (not rotating), L1 and L2 is a constant number. I1($t$) and I2($t$) has a phase delay of φ1 and φ2, respectively, but φ1=φ2=90° (degree) and flux interference is negligible since wL1>>R and wL2>>R for the high angular speed w of the resolver driving voltage, where w may nominally be as high as around 10 kilohertz (kHz).

When the resolver rotates at angular speed Ω, the steady state phase delay in equations (26) and (27) can be rewritten as follows:

$$\phi 1 = \tan^{-1}\left[\frac{\Omega L1}{R}\right] \quad (29)$$

$$\phi 2 = \tan^{-1}\left[\frac{\Omega L2}{R}\right] \quad (30)$$

Equations (29) and (30) do not satisfy ΩL1>>R and ΩL2>>R since the resolver rotation angular speed Ω may be as low as around a few hundred hertz, and the value of L1 may be different from that of L2 at an arbitrary resolver rotation phase θ.

The phase difference of φ1−φ2 arises due to the phase delay difference in equations (29) and (30), which causes magnetic flux interference between the orthogonal poles and becomes worse as the resolver rotates at higher speeds.

The resolver output voltage under the magnetic flux interference may be expressed as follows:

$$V\sin = K(1-K1(\Delta\phi)*m^2*\Omega^2*\cos\theta)*\sin\theta*\sin(wt) \quad (31)$$

$$V\cos = K(1-K1(\Delta\phi)*m^2*\Omega^2*\sin\theta)*\cos\theta*\sin(wt) \quad (32)$$

K refers to a constant used for unit conversion of the variables, and K1(Δφ) represents the flux interference between the orthogonal poles, which is proportional to phase delay difference in equations (29) and (30).

A Lissajous graph of the resolver output voltage waveform when the resolver rotates at 60 Hz and 200 Hz is shown in FIGS. 6($a$) and 6($b$), respectively. The solid line represents the resolver output voltage when the resolver is in a static state, while the dashed and dotted lines represent the resolver output voltage when the driving signals are sin(θ) and −sin(θ), respectively.

A comparison of FIG. 6($a$) and FIG. 6($b$) shows a more distorted output waveform due to the increased interference flux between orthogonal poles as the resolver rotates at higher speed.

Figure 7:
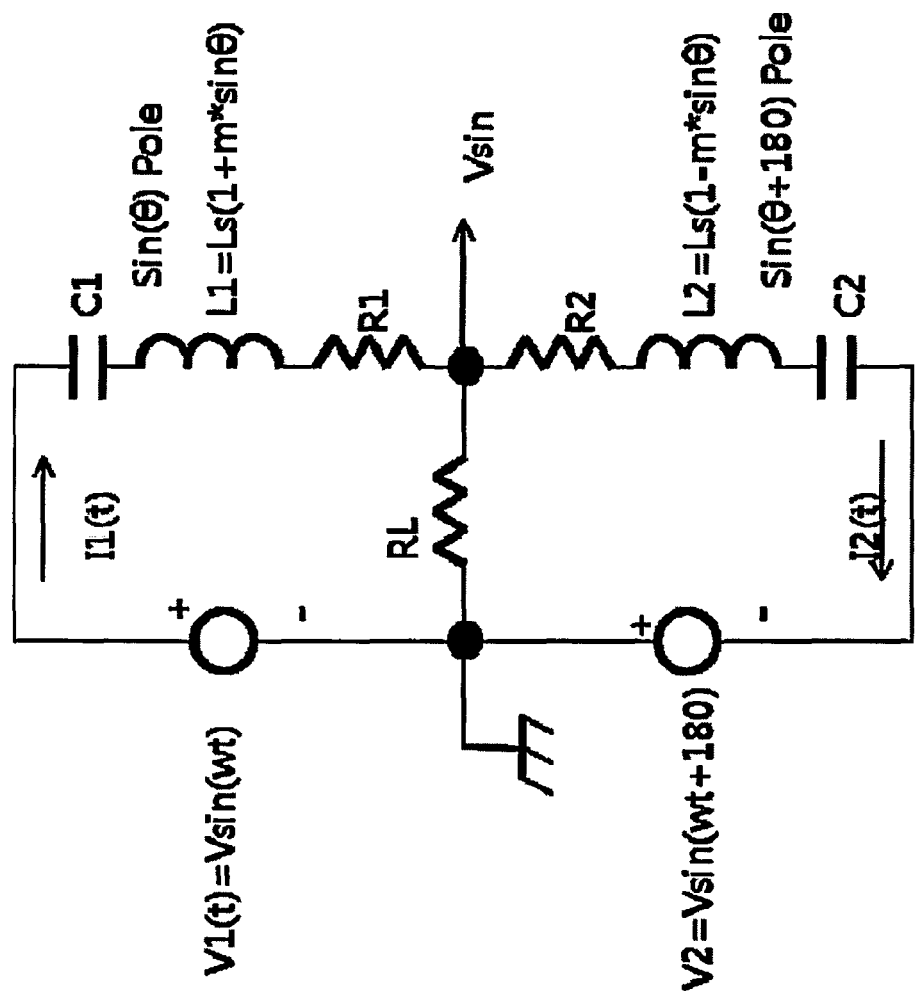
FIG. 7 is an equivalent circuit diagram of voltages and currents at the sine poles when capacitive passive elements are attached to an exemplary balanced resolver wiring, in accordance with one or more embodiments.
Figure 9:
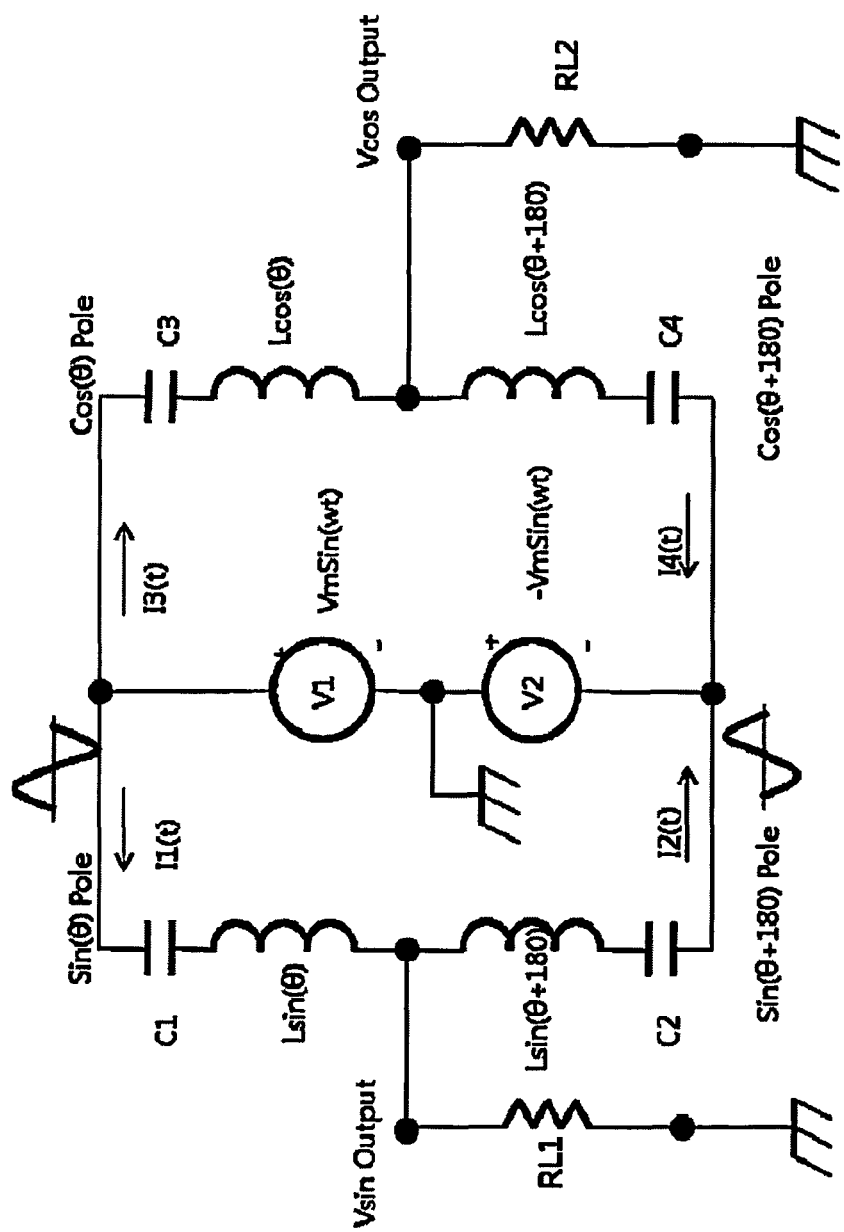
FIG. 9 is a circuit diagram of an exemplary balanced resolver wiring when capacitive passive elements are attached to the wiring, in accordance with one or more embodiments.

The flux interference between orthogonal poles may be reduced by adding capacitive passive elements as shown in FIG. 7 and FIG. 9. The currents I1($t$) and I2($t$) in FIG. 7, which have phases φ1 and φ2, respectively, may be expressed as follows:

$$I1(t) = \frac{V}{\sqrt{(R^2 + (wL1 - 1/(wC1))^2)}} \sin(wt - \phi 1) \quad (33)$$

$$\phi 1 = \tan^{-1}\left[\frac{wL1 - 1/(wC1)}{R}\right] \quad (34)$$

$$I2(t) = \frac{V}{\sqrt{(R^2 + (wL2 - 1/(wC2))^2)}} \sin(wt - \phi 2) \quad (35)$$

$$\phi 2 = \tan^{-1}\left[\frac{wL2 - 1/(wC2)}{R}\right] \quad (36)$$

Equations (33), (34), (35), and (36) approach asymptotically to the equations (25), (26), (27), and (28), respectively, if wL1>>(1/wC1) and wL2>>(1/wC2) approximation is applied for a nominal resolver angular speed w.

When the resolver rotates with angular speed Ω, equations (34) and (36) become as follows:

$$\phi 1 = \tan^{-1}\left[\frac{\Omega L1 - 1/(\Omega C1)}{R}\right] \quad (37)$$

$$\phi 2 = \tan^{-1}\left[\frac{\Omega L2 - 1/(\Omega C2)}{R}\right] \quad (38)$$

Equations (37) and (38) have a constant 90 degree phase if the following approximation is applied: ΩL1<<1/(ΩC1), ΩL2<<1/(ΩC2), and 1/(ΩC1)>>R, 1/(ΩC2)>>R.

Figure 8:
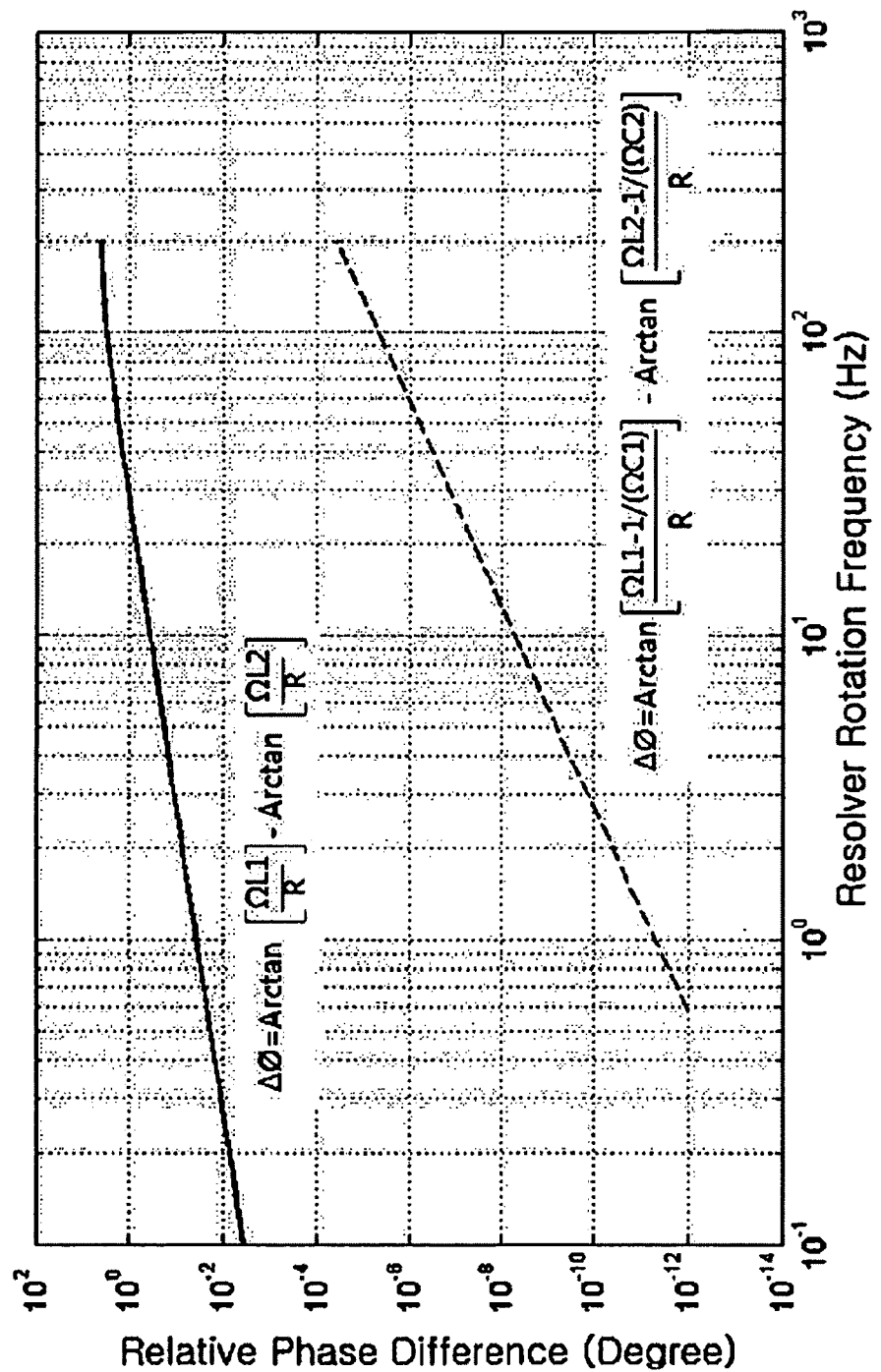
FIG. 8 illustrates a relative phase difference of current between the sin(θ) and sin(θ+180) poles with respect to various resolver frequencies, in accordance with one or more embodiments.

In FIG. 8, a relative phase difference (ΔΦ) of current between the sin(θ) and sin(θ+180) poles, I1($t$) and I2($t$), for various resolver speeds is shown. The solid and dashed lines represent the phase differences for a resolver without and with capacitive passive elements, respectively. FIG. 8 shows that adding capacitive passive elements theoretically provides around a 50 decibel (dB) improvement at resolver speed 200 Hz (ΔΦ=4 degrees and ΔΦ=0.00004 degrees without and with capacitive elements, respectively). Much reduced ΔΦ is associated with much smaller K1(Δφ), implying that the dashed and dotted lines approach the solid line in FIGS. 6($a$) and ($b$).

These much improved results, mainly owing to interference cancelation between orthogonal poles, are guaranteed in ideal conditions. However, magnetic interference may also be caused by resolver driving signal source distortion, resolver voltage supply imbalance, and mechanical and electrical tolerance of resolver itself, etc. Therefore, interference caused by the $2^{nd}$ and higher order harmonics should be considered, as well as fundamental frequencies, as shown in equations (31) and (32).

Due to the non-linear properties of resolver interference flux, analytical solutions may not be feasible. However, it is noted that the resolver interference currents, Im1, Im2, Im3, and Im4 in equations (15), (16), (17), and (18), may be considered as a sum of interferences from pole of the same polarity and orthogonal poles. Therefore, (Im1−Im2) and (Im3−Im4) may be non-zero, and interference current can be expressed by the sum of higher order harmonics and fundamental frequencies.

Assuming a symmetrically wired resolver, interference currents induced from sin poles, Im1−Im2, and cos poles, Im3−Im4, may be expressed by the following higher than fundamental frequencies, the $2^{nd}$ and $3^{rd}$ order harmonics, etc.:

$$Im1-Im2 = (K^2*\sin^2\theta) + (K^3*\sin\theta*\cos^2\theta) + \ldots \quad (39)$$

$$Im2-Im4 = (K^2*\cos^2\theta) + (K^3*\sin^2\theta*\cos\theta) + \ldots \quad (40)$$

As disclosed in U.S. patent application Ser. No. 12/484,207, by adding capacitive passive elements to the resolver wiring, the interference current from the $2^{nd}$ order harmonics may be minimized by 90 degree phase shifting between the current of pole of interest and interference currents from the orthogonal poles.

In order to get rid of interference current from higher order harmonics, the circuit illustrated in FIG. 9 may be used in a balanced wired resolver that is differentially driven, where capacitive passive elements C1, C2, C3, and C4 are also included.

Figure 10:
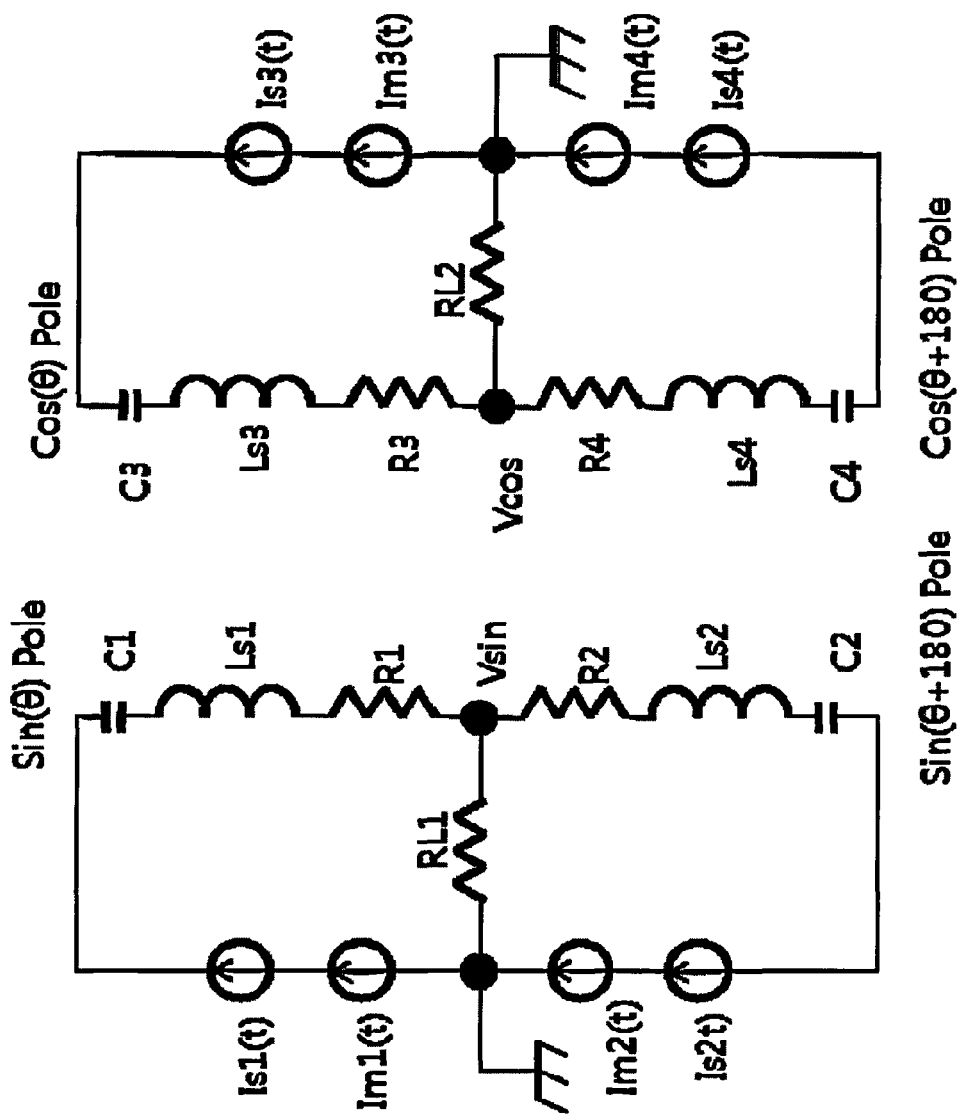
FIG. 10 is an equivalent circuit diagram of an exemplary balanced wiring when capacitive passive elements are attached to the wiring, in accordance with one or more embodiments.

In FIG. 10, an equivalent circuit for FIG. 9 is provided. C1, C2, C3, and C4 have a high reactance (i.e., impedance) on the current of resolver rotation frequency (nominally below hundreds of Hz) and a low reactance (impedance) on the current of driving signal frequency (nominally about 10 KHz) as shown in U.S. patent application Ser. No. 12/484,207.

As a result, the phase of the interference current at sin pole is 90 degree faster than that of $I1(t)$. When the capacitive passive elements are added as shown in FIG. 10, the interference currents due to the higher order harmonics in equations (39) and (40) may be rewritten as follows:

$$Im1 - Im2 = (K^2 * \sin^2\theta) + (K^3 * \sin\theta * \cos^2\theta) + \quad (41)$$
$$(K^2 * \sin\theta * \sin(\theta + 90)) +$$
$$(K^3 \sin\theta * \cos(\theta + 90) * \cos(\theta + 90)) + \ldots$$
$$= (K^2 * \sin\theta * \cos\theta) + (K^3 * \sin^3\theta) + \ldots$$

$$Im3 - Im4 = (K^2 * \cos^2\theta) + (K^3 * \sin^2\theta * \cos\theta) + \quad (42)$$
$$(K^2 * \cos\theta * \cos(\theta + 90)) +$$
$$(K^3 \cos\theta * \sin(\theta + 90) * \sin(\theta + 90)) + \ldots$$
$$= (K^2 * \cos\theta * \sin\theta) + (K^3 * \cos^3\theta) + \ldots$$

Without the capacitive passive elements shown in FIG. 4, the output voltages, V sin and V cos, may be expressed using the interference currents as follows:

$$V\sin = RL1 * [(Is1 - Is2) + (Im1 - Im2)] \quad (43)$$
$$= RL1 * I0 * [m * \sin\theta + m^2 * (K^2 * \sin^2\theta) +$$
$$m^3 * (K^3 \sin\theta * \cos^2\theta) + \ldots]$$

$$V\cos = RL2 * [(Is3 - Is4) + (Im3 - Im4)]RL2 * I0 * \quad (44)$$
$$= [m * \cos\theta + m^2 * (K^2 * \cos^2\theta) +$$
$$m^3 * (K^3 \cos\theta * \sin^2\theta) + \ldots]$$

When the capacitive passive elements are added as shown in FIG. 10 from the equations (19), (20), (41), and (42), the output voltages, V sin and V cos, may be expressed using the interference currents as follows:

$$V\sin = RL1 * [(Is1 - Is2) + (Im1 - Im2)] \quad (45)$$
$$= RL1 * I0 * [m * \sin\theta + m^2 * (K^2 * \sin\theta * \cos\theta) +$$
$$m^3 * (K^3 * \sin^3\theta) + \ldots]$$

$$V\cos = RL2 * [(Is3 - Is4) + (Im3 - Im4)] \quad (46)$$
$$= RL2 * I0 * [m * \cos\theta + m^2 * (K^2 * \cos\theta * \sin\theta) +$$
$$m^3 * (K^3 * \cos^3\theta) + \ldots]$$

To illustrate the improved orthogonality of resolver output voltage by adding the capacitive passive elements to the resolver, equations (43) and (45) is plotted in FIG. 11(a) for V sin output, and equations of (44) and (46) are plotted in FIG. 11(b) for V cos output. The dashed line and dotted lines represent the outputs without and with capacitive passive elements, respectively, while the ideal sine and cosine waveform is represented by the solid line.

In FIG. 11(c), a Lissajous graph corresponding to the Lissajous graphs shown in FIG. 11(a) and FIG. 11(b) is provided. FIG. 11(c) shows that the output for a resolver with the capacitive passive elements added (dotted line) is very close to the output for an ideal sinusoidal waveform (solid line).

The above-noted results match with what is achieved by the invention disclosed by U.S. patent application Ser. No. 12/484,207, where interferences between orthogonal poles are mutually and interactively canceled through the 90 degree phase shift of interference currents caused by capacitive passive elements serially connected to each coil winding.

Improved accuracy of phase measurement in a resolver is achieved by the present invention as the interference currents induced between poles of the same polarity are canceled by driving the resolver with differential signals and wiring the resolver in a balanced manner.

What follows is the exemplary realization of a resolver in accordance with the present invention to prove the effectiveness of the present invention.

Figure 12:
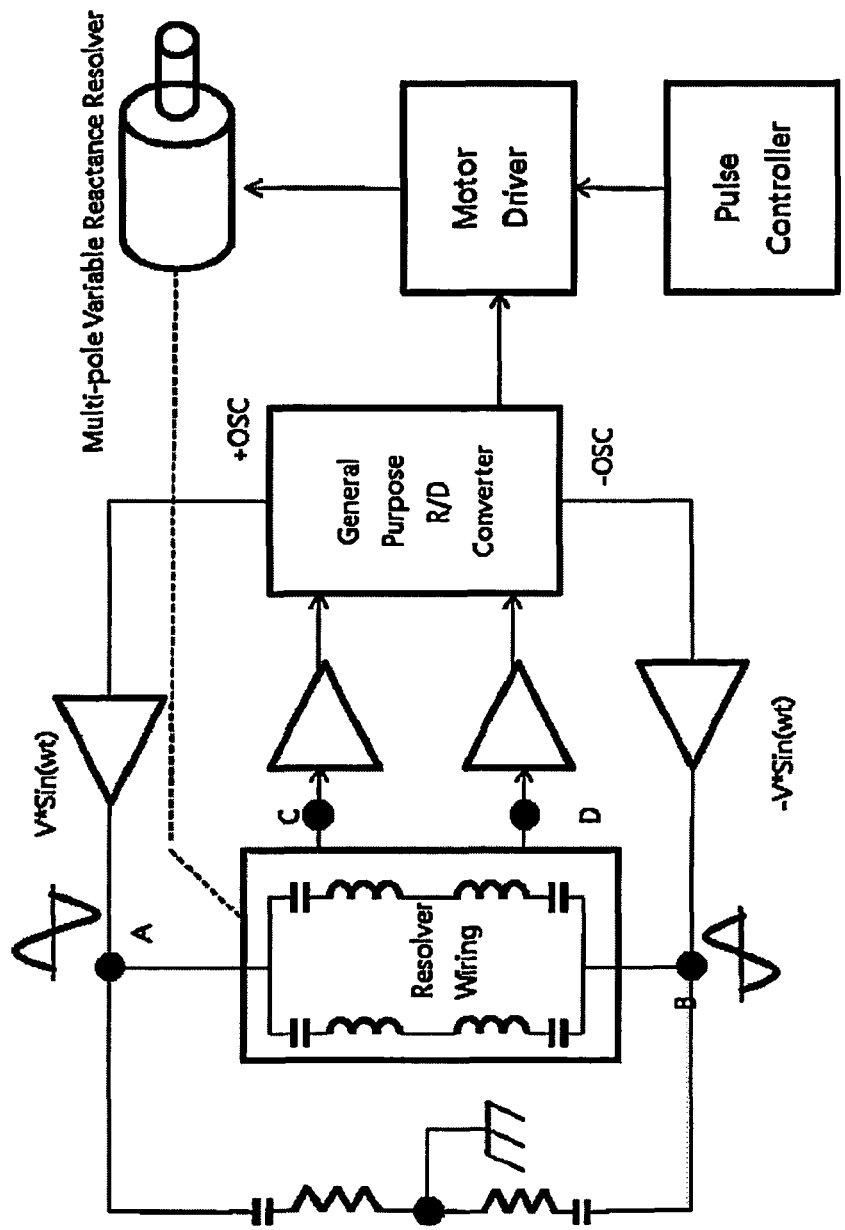
FIG. 12 is a block diagram of an exemplary experimental realization for the testing and verification of an exemplary multi-pole resolver, in accordance with one or more embodiments.

As shown in FIG. 12, after V sin and V cos output voltages are amplified by an operational amplifier, the output of amplifier is resolver-to-digital (R/D) converted by a general R/D converter, and the angular phase information is fed into the motor driver to drive the motor of a multi-pole variable reluctance resolver.

In this realization, a 124-pole variable reluctance resolver is balanced wired and driven by 180 differential signals, where capacitive passive elements are also added to the resolver.

The direct current (DC) resistance of the adopted resolver wire is an (ohms) and the inductance varies between 26 milihenries (mH)~30 mH during a single electrical cycle of resolver rotation.

Three types of 5V peak-to-peak (5 Vpp) 12 KHz driving signals are applied: an ideal sinusoidal signal, a distorted sinusoidal signal, and a square wave type signal.

For each type of driving signal, the state of resolver motor rotation is observed, and the orthogonality of resolver output voltage signal is measured when the resolver rotates at a low speed of 0.5 rotations per second (RPS), around 62 Hz, and at a high speed of 1.6 RPS, around 200 Hz.

Figure 13:
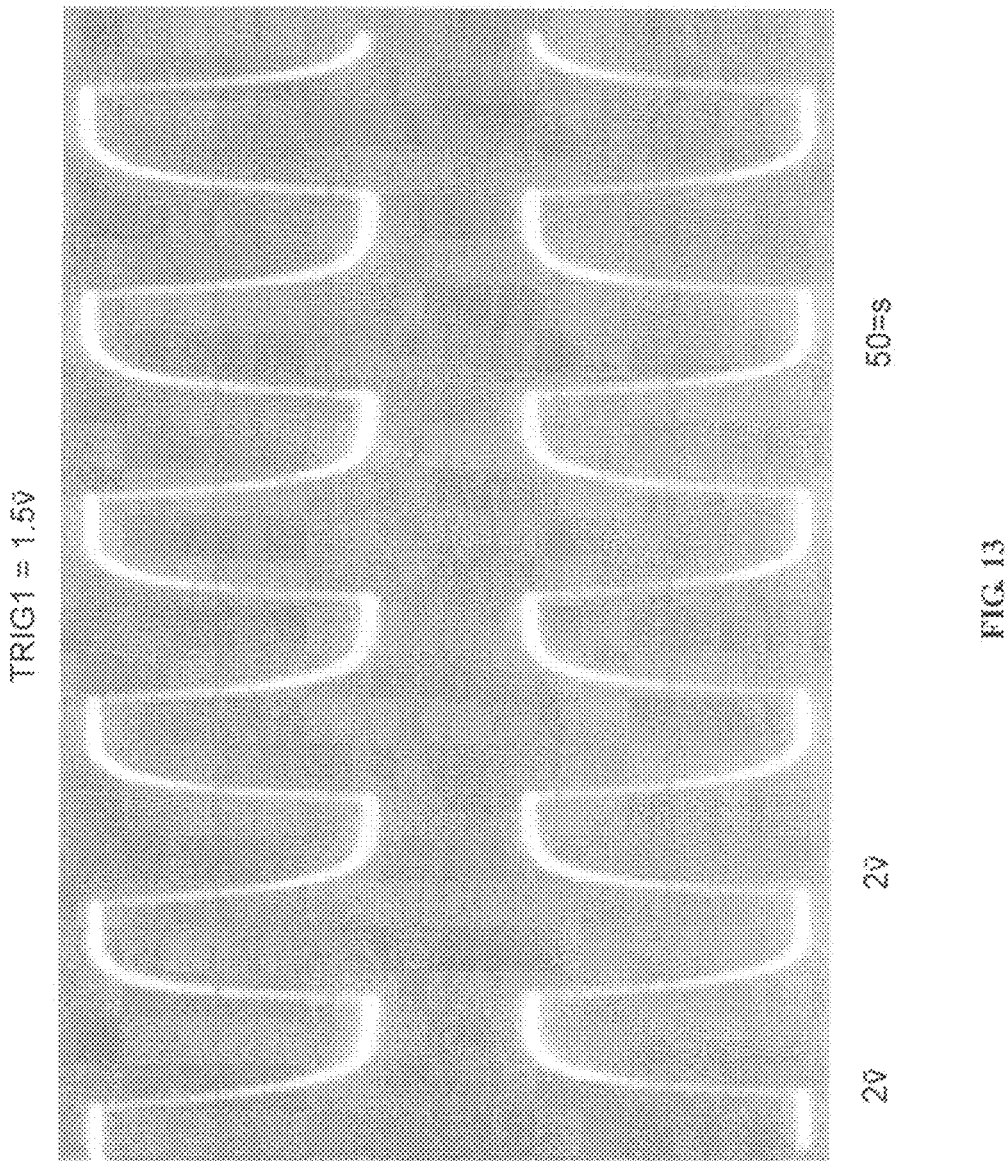
FIG. 13 is a waveform capture of a square wave type resolver driving signal applied to the experimental realization in FIG. 12.

FIG. 13 shows the oscilloscope screen capture of a square wave type signal applied to the exemplary experimental realization in FIG. 12.

Figure 14:
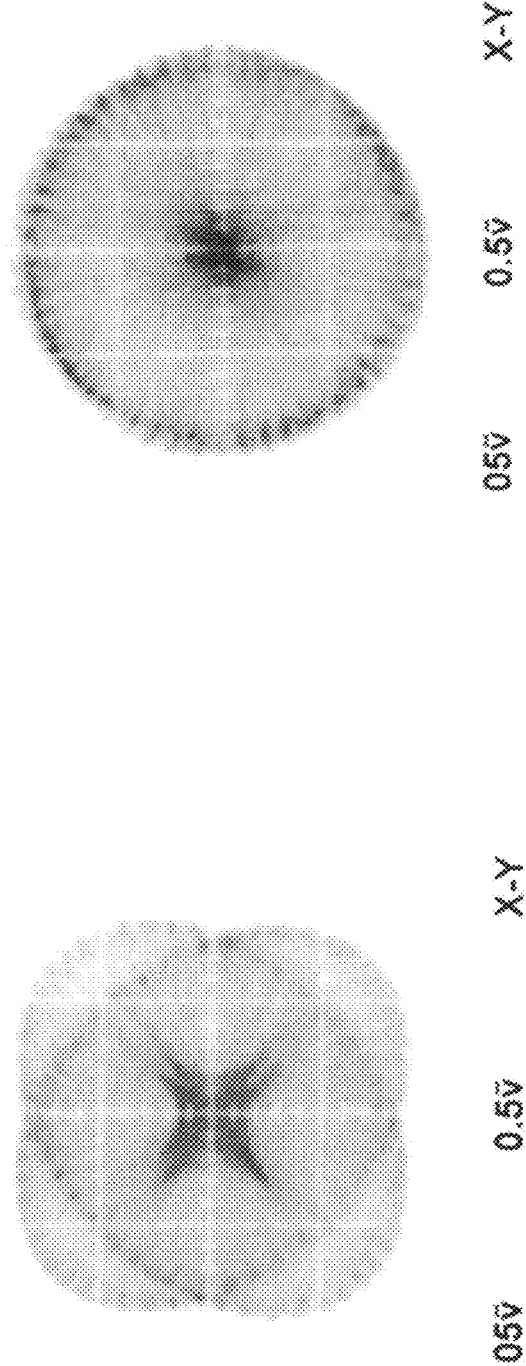
FIG. 14(a) is a Lissajous graph of the output waveform driven by the square wave type signal in FIG. 13 before installing capacitive passive elements to the resolver wiring when the resolver rotates at low speed.
FIG. 14(b) is a Lissajous graph of the output waveform driven by the square wave type signal in FIG. 13 before installing capacitive passive elements to the resolver wiring when the resolver rotates at high speed.

FIG. 14(a) shows V sin and V cos Lissajous graphs of the output waveform driven by the square wave type signal shown in FIG. 13 without capacitive passive elements when the resolver rotates at high speed of 200 Hz. This figure shows that distortion is very severe when the resolver rotates at high speed without capacitive passive elements.

FIG. 14(b) shows that with the addition of the capacitive passive elements in FIG. 12, the orthogonality between sine and cosine output voltages is maintained very well even at a high speed resolver rotation of 200 Hz when the resolver driving signal is severely distorted like s square wave as shown in FIG. 13. This means that not much distortion is observed by the addition of capacitive passive elements even at a high speed of resolver rotation with a much distorted square wave type signal; the distortion is very close to that of a near sinusoidal signal case.

During the experimental realization described above, it was observed that a significant noise from the motor driving unit is induced into the balanced wired circuit, thereby heavily distorting the resolver output voltages. It was found that balanced operation of the balanced wired resolver is highly sensitive to the voltage variations at the points at which the resolver driving voltage is applied (points A and B in FIG. 12).

Figure 15:
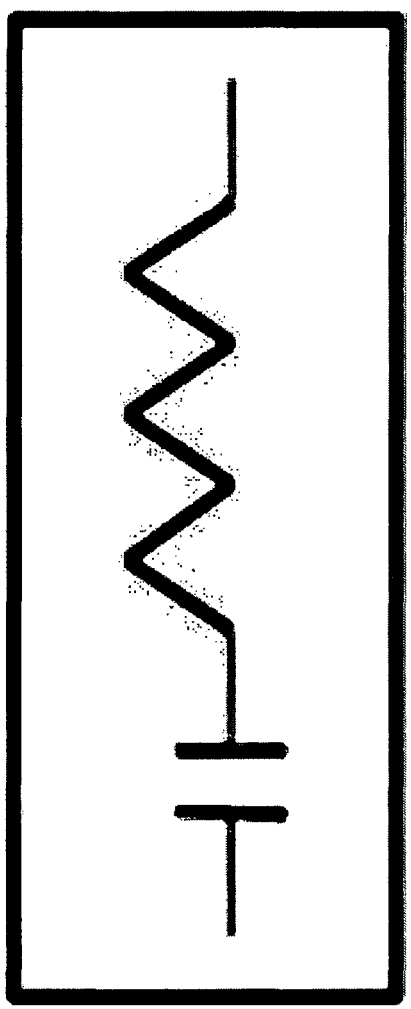
FIG. 15 illustrates an exemplary resistive and capacitive element network for the impedance adjustment, in accordance with one or more embodiments.

However, this problem may be resolved by adjusting the impedance at points A, B, C, and D in FIG. 12 by adding a symmetrical capacitance and resistance network as shown in FIG. 15.

Using the general purpose 12 bit R/D converter at 1.6 RPS, a fairly high resolution such as 800,000 pulses per second may be realized with the 124-poles variable reluctance resolver.

The orthogonality of the resolver output voltages maintains well by inserting passive capacitive elements in the balanced wired resolver, and driving the resolver using 180 degree differential signals. Additional impedance adjustment may be made to overcome the inherent high sensitivity to external noise of the balanced wiring.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A method for minimizing magnetic interference in a multi-pole variable reluctance resolver, the method comprising:

driving a differential sinusoidal signal source through a balanced resolver wiring, wherein the signal source has a 180 degree differential and a frequency of less than 50,000 hertz, and wherein magnetic interference between poles of a same polarity in the resolver is minimized by the balanced resolver wiring;

adding at least one capacitive passive element serially to each winding of the resolver, wherein magnetic interference on each winding of the resolver is canceled, wherein magnetic interference between orthogonal poles in the resolver is minimized, wherein resolver rotation current maintains a constant phase, and wherein resolver rotation frequency is less than a few hundred hertz; and outputting a low distortion sine and cosine signal from the resolver.

2. A multi-pole variable reluctance resolver apparatus, the resolver apparatus comprising:

a balanced resolver wiring through which a differential sinusoidal signal source is driven, wherein the signal source has a 180 degree differential and a frequency of less than 50,000 hertz wherein magnetic interference between poles of a same polarity in the resolver is minimized by the balanced resolver wiring;

at least one capacitive passive element added serially to each winding of the resolver, wherein magnetic interference on each winding of the resolver is canceled, wherein magnetic interference between orthogonal poles in the resolver is minimized, wherein resolver rotation current maintains a constant phase, and wherein resolver rotation frequency is less than a few hundred hertz; and a low distortion sine and cosine signal outputted from the resolver.

3. The resolver apparatus according to claim 2, further comprising impedance adjustment networks symmetrically connected to points at which the signal source is applied, wherein the impedance adjustment network comprises capacitors and resistors, and wherein each impedance adjustment network has the same time constant.

* * * * *